United States Patent [19]

Ellsberg

[11] Patent Number: 4,845,484

[45] Date of Patent: Jul. 4, 1989

[54] RETROFIT, NEWSPAPER TRACKING AUDIT SYSTEM FOR NEWSPAPER RACK MACHINES

[75] Inventor: Thomas R. Ellsberg, Bend, Oreg.

[73] Assignee: Bellatrix Systems, Inc., Bend, Oreg.

[21] Appl. No.: 107,355

[22] Filed: Oct. 9, 1987

[51] Int. Cl.[4] .......................... G06F 7/04; G08B 5/22

[52] U.S. Cl. ................................ 340/825.35; 211/4; 221/154; 232/1 L; 232/1 R

[58] Field of Search ....................... 340/825.35; 211/4; 194/302, 200; 232/1 C, 1 R 221/154 221/227

[56] References Cited

U.S. PATENT DOCUMENTS

| | | | |
|---|---|---|---|
| 3,786,421 | 1/1974 | Wostl et al. . | |
| 3,894,220 | 7/1975 | Levasseur . | |
| 3,931,497 | 1/1976 | Gentile et al. . | |
| 4,072,930 | 2/1988 | Lucero et al. . | |
| 4,075,463 | 2/1978 | Equizabel . | |
| 4,086,434 | 4/1978 | Bocchi . | |
| 4,140,242 | 2/1979 | Muller et al. | 221/154 |
| 4,174,047 | 11/1979 | Owens | 221/154 |
| 4,216,461 | 8/1980 | Werth et al. | 340/825.35 |
| 4,231,105 | 10/1980 | Schuller et al. . | |
| 4,272,757 | 6/1981 | McLaughlin et al. . | |
| 4,306,219 | 12/1981 | Main et al. . | |
| 4,338,601 | 7/1982 | Nance-Kivell . | |
| 4,369,442 | 1/1983 | Werth et al. | 340/825.35 |
| 4,454,414 | 6/1984 | Benton . | |
| 4,496,074 | 1/1985 | Owens | 222/227 |
| 4,611,205 | 10/1983 | Eglise . | |

FOREIGN PATENT DOCUMENTS

| | | | |
|---|---|---|---|
| 2086114 | 5/1982 | United Kingdom | 340/825.35 |

*Primary Examiner*—Donald J. Yusko
*Assistant Examiner*—Tyrone Queen
*Attorney, Agent, or Firm*—Kolisch, Hartwell & Dickinson

[57] ABSTRACT

A retrofit, automatic audit system for a door-access, coin-operated newspaper rack machine is disclosed. The system operates in conjunction with the standard door-lock mechanism and includes a retrofit purchase-mechanism mounted on the machine. The purchase-mechanism includes an electromechanical audit structure which is operatively connected to the purchase-mechanism and door-lock mechanism and monitors and records service and transaction audit data involving the purchase-mechanism. A portable data transfer unit is proximity coupleable with the audit structure for acquiring audit data therefrom. The system includes proximity activation through magnetic structure which causes the audit structure to shift from a data acquisition mode to an automatic data transfer mode when a data transfer unit is proximity coupled thereto. Communication means between the audit structure and the data transfer unit includes an optical structure providing communication therebetween.

31 Claims, 8 Drawing Sheets

WAND FUNCTIONS

AUDIT STRUCTURE / WAND COMMUNICATIONS

RETROFIT, NEWSPAPER TRACKING AUDIT SYSTEM FOR NEWSPAPER RACK MACHINES

BACKGROUND AND SUMMARY OF THE INVENTION

This invention pertains to an automatic audit system for "tracking" the single-copy sales of newspapers, and more particularly, to such a system which is designed for retrofitting into the purchase-mechanism box of a standardized-type, door-access newspaper rack machine.

In recent years, a growing factor in the sales of newspapers is the increase in newspaper sales from "on the street", single-copy sales from newsstands, dealer outlets (such as convenience stores) and so-called newspaper racks or rack machines. As a consequence of this factor, the economic facts of life, vis-a-vis the importance of rack-machine sales, has dictated the desire to find some reliable and suitable way to audit and track such sales.

For example, it is certainly desirable for a newspaper organization to be able to audit accurately the money-flow which occurs on a machine-by-machine or outlet-by-outlet basis, so as to note purchasing densities in a manner enabling the most economic and judicious locating of rack machines and outlets. Further, it is important for a newspaper to develop data relating to the patterns of sales activity, such as, for example, the times of day that the various purchases from a machine take place.

An important consideration in designing and implementing an appropriate rack machine audit system of the type which could handle the considerations just generally outlined, is that it should be as tamper-proof as possible, and as easy as possible to use by the service personnel who attend the machines. Also, and considering the fact that maintenance costs should be held as low as possible, it is important that an audit system remain in good operating condition for extremely long periods of time, so that maintenance activity is held to a minimum. Further, it is important, inasmuch as many newspaper rack machines are constantly exposed to the elements, that the system perform in such a manner that weather conditions do not interfere with its operation.

A principal object, therefore, of the present invention is to provide a newspaper audit system which takes into account all of the above-mentioned considerations in a practical and very satisfactory and reliable manner.

More particularly, an object of the invention is to provide a newspaper audit system which is easily retrofittable into the usual purchase-mechanism box of a standardized-type, door-access newspaper rack machine. Retrofittably is, of course, an extremely important feature when one considers what might otherwise be the cost of designing, building and installing complete, new, replacement rack machines.

A further object of the invention is to provide an audit system which provides means for inputting sales data regarding newspapers sold over-the-counter by dealer outlets.

Another object of the invention is to provide a system of the type generally outlined which is substantially tamper free, extremely simple to use, reliable, and highly resistant to damage by the elements.

According to a preferred embodiment of the invention, the proposed audit system, with respect to the retrofit components, includes a frame, a purchase mechanism mounted on the frame, which mechanism typically will be a coin-receiving mechanism, electromechanical audit structure which is carried on the frame and coupled to the purchase mechanism for monitoring and recording transaction data (amount of money received, date and time of transaction, etc.), and a free, portable data-transfer unit (pocket-sized and hand-holdable) for proximity coupling with the audit structure, from a position outside a rack machine, to acquire (periodically, and on a regular basis) audit data which is stored in the audit structure. The data transfer unit is capable of retrieving data from numerous rack machines containing the audit structure of the invention and is operable to receive manually input data for sales by dealer outlets.

Included in the audit structure is a weather-closed, remote-proximity-activated, data-access communication port which is designed to fit conveniently, and in a sealed manner, in the usual key-receiving aperture found in conventional rack machines. This is an important retrofit feature.

FIG. *6a*, *6b* and *6c* show a flow chart of counter/-wand communications which occur during data transfer.

Figure 7:
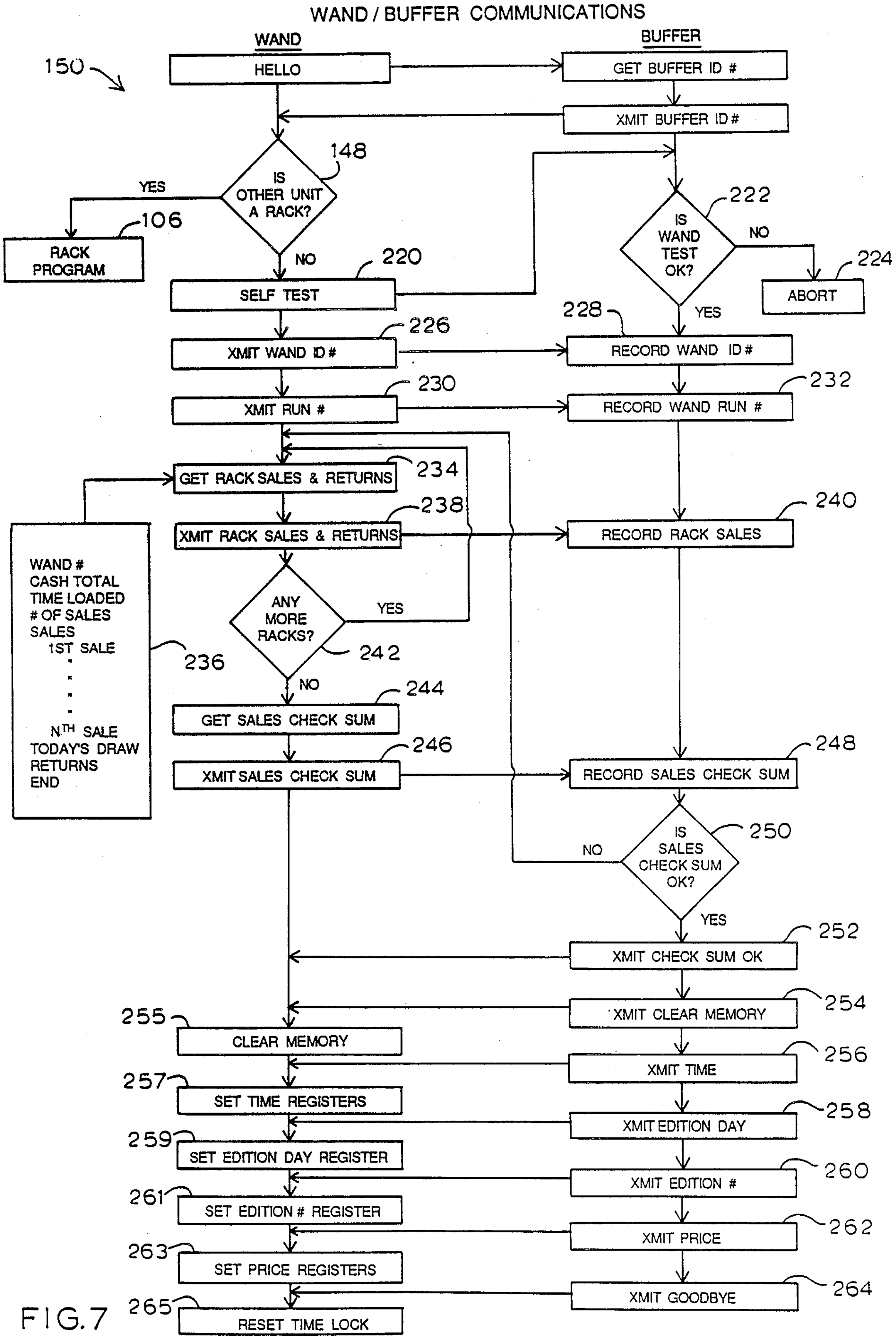

FIG. 7 is a flow chart of wand/buffer communications which occur during transfer of data between the wand and the buffer of the invention.

DETAILED DESCRIPTION OF THE PREFERRED EMBODIMENT

Figure 1:
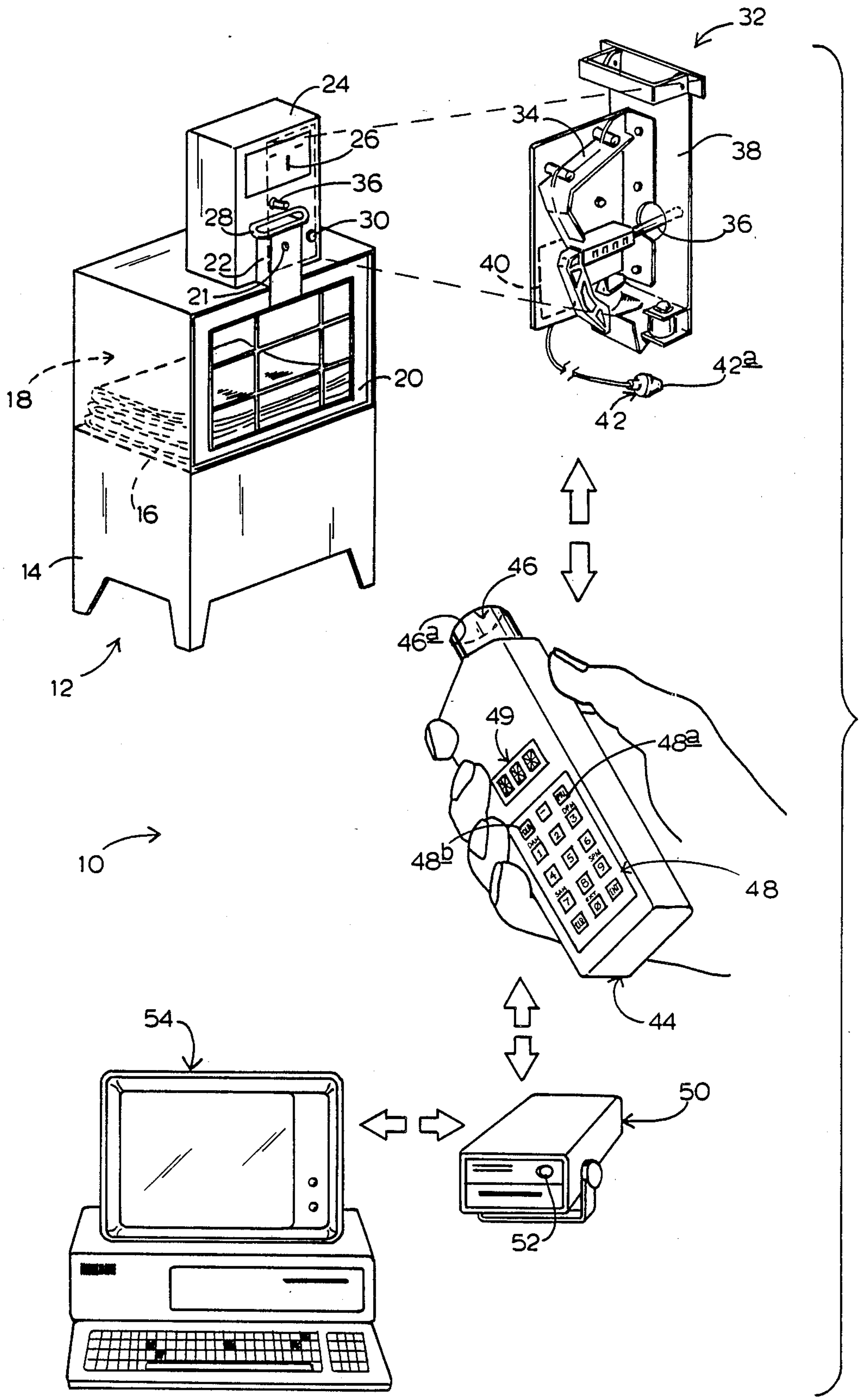
FIG. 1 is a pictorial, not-to-scale representation of the components of the audit system of the invention as used in connection with a standard, door-access, coin-operated newspaper rack machine.

Turning now to the drawings, and initially to FIG. 1, the components of an automatic audit system 10 intended for use in a newspaper rack machine are shown. System 10 is intended to be installed, or retrofitted, into a standardized newspaper rack machine 12. Machine 12 includes a stand 14 having newspapers 16 received in a newspaper-containing bay 18 therein. Entrance into bay 18 is gained through access door 20 which is normally locked by door-lock mechanism 22 having a key hole 21 and key-lock mechanism therein. Door-lock mechanism 22 may be unlocked by insertion of a key into key hole 21, for placement of papers in bay 18 by service personnel. Service personnel may alternately gain access to bay 18 by inserting the appropriate coins or slugs into coin slot(s) 26, which are a part of a purchase-mechanism box 24.

In the normal course of operation, a newspaper customer desiring to purchase a newspaper deposits the appropriate coin(s) into slot 26, pulls on handle 28, thereby opening door 20, and removes his newspaper from within bay 18. Door 20 has a transparent window 20a in the front thereof to enable the customer to determine whether or not there are newspapers in the machine.

In the case of known prior art systems, service personnel are able to set the price of the newspapers contained in the machine by inserting a key into key-receiving aperture 30 and selecting the proper price for the newspaper. Such selection is usually limited to two pre-set prices.

Access to the normal coin handling mechanism and a cash tray, contained in purchase-mechanism box 24, is normally made through another lock system, typically located on the rear of box 24. The cash tray is not accessible through bay 18.

A retrofit purchase-mechanism, or coin handling mechanism, of the invention is shown in FIG. 1 at 32. Mechanism 32 includes coin path guide 34, which is located in back of slot 26 and a coin release mechanism 36 for freeing bent or otherwise unacceptable coins. Mechanism 32 has a frame 38 carried thereon which has an electromechanical audit structure 40 mounted thereon. Audit structure 40 is operatively connected to purchase-mechanism 32 and to door lock mechanism 22. Audit structure 40 is operable to monitor and record transaction audit data involving the purchase-mechanism of the system. Such audit data will be described in greater detail later herein, but essentially includes information as to the time the machine is loaded or serviced by service personnel, the number of papers purchased, the time of purchase and the amount of money received by the purchase-mechanism box. Audit structure 40 is powered by a long-life battery.

Audit structure 40 includes a port 42 which is received in key-receiving aperture 30 and replaces the normal price selection mechanism of the standard newspaper rack machine. Port 42 is a weather-closed structure and is seal-fittable within aperture 30 to maintain a weather-tight seal within purchase-mechanism box 24.

Another component of system 10 is a data transfer unit (DTU) 44, also referred to herein as a wand. Wand 44 is a free standing, portable unit that is proximity coupleable with audit structure 40 from outside machine 12 via port 42 and is operable to acquire audit data from the audit structure. In the preferred embodiment, wand 44 includes, at one end thereof, a coupling mechanism 46 which is dockable with port 42 for transferring data between audit structure 40 and wand 44. In the preferred embodiment, port 42 has a male projection **42*a* extending therefrom, and coupling mechanism 46 has a female portion 46*a* formed in the free end thereof. Female portion 46*a* is dockable with male portion 42*a* to provide data-access communications between audit structure 40 and wand 44**.

Wand 44 further includes manual manipulation means, shown in the form of a key board 48 which allows the operator to enter a preselected data stream into the wand to indicate the conclusion of a transfer sequence or to manually input data. Specific keys perform dedicated functions, such as key **48*a*, a special price key, and key 48*b*, a dealer key. A display 49** provides prompts to the service person using the wand.

Once audit data has been acquired from a number of rack machines by wand 44, at the end of a service person's rounds, for instance, the information is transferred from wand 44 to a buffer 50 having a port 52 therein, which port is constructed similarly to port 42, for temporary storage of data from a plurality of wands 44. When all of the wands, in the particular identity group or series to which buffer 50 is assigned, have transferred data into buffer 50, the data is then transferred, by suitable data transfer means, to a central storage/processing unit 54 where the data may be further manipulated, analyzed and otherwise put to beneficial use.

Figure 2:
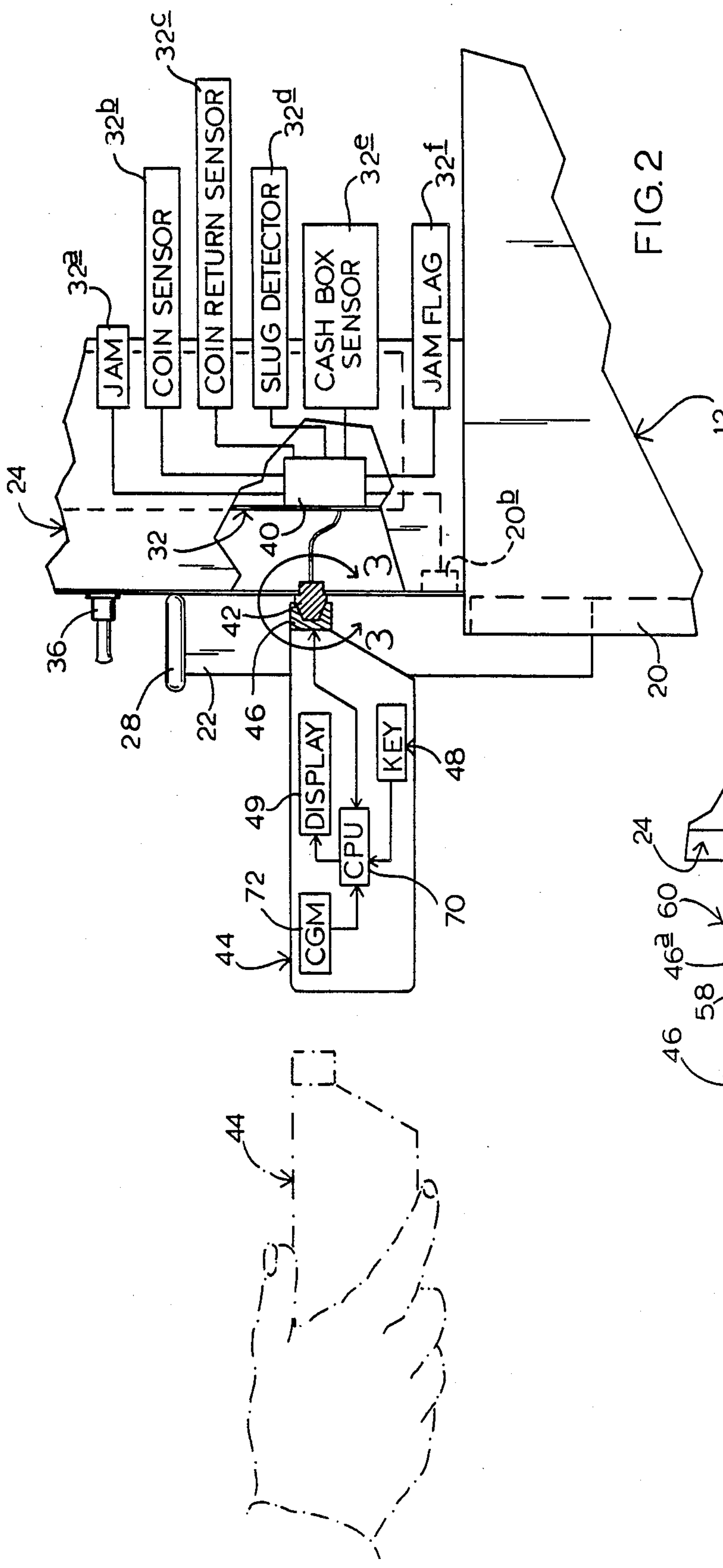
FIG. 2 depicts a data-transfer unit and purchase mechanism of the invention proximity coupled to one another.

Referring now to FIG. 2, wand 44 is shown, in phantom line, approaching rack machine 12. When wand 44 is brought proximal the machine and coupling mechanism 46 docked with port 42, audit structure 40 is proximity activated. Under normal conditions, audit structure 40 operates in a low power or low clockrate data acquisition mode wherein the audit structure essentially conserves battery power. The placing of wand 44 in a proximal relationship to port 42 causes the audit structure to be proximity activated, thereby shifting it to a higher clock speed and initiating an automatic data transfer mode, which allows communication between the audit structure and the wand and also unlocks door 20.

Figure 3:
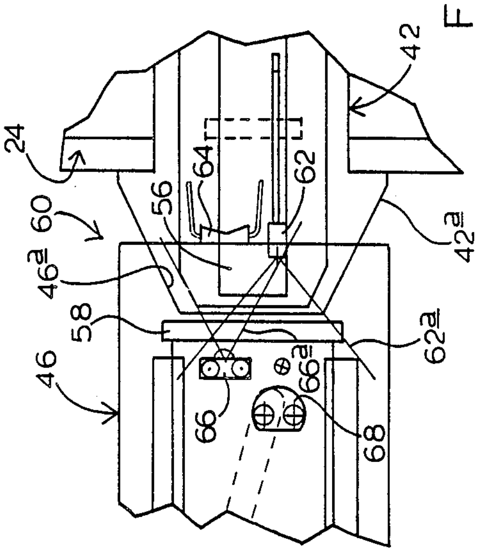
FIG. 3 is a greatly enlarged, somewhat schematic representation of a docking structure of the invention.

In the preferred embodiment, proximity activation occurs through magnetic structure which, and now referring to FIG. 3, takes place as a result of a magnet 56 which is located in port 42 and a magnetic actuatable switch 58 located in coupling mechanism 46. Magnet 56 is of the permanent type. The magnet is located in male projection 42 of the port to ensure that it extends away from the face of the machine, beyond the plane of the front thereof. With this particular construction, magnet 56 does not effect potentially disrupting magnetic coupling with the surrounding face of the purchase-mechanism box. The relative positions of magnet 56 and switch 58 may be changed, provided proper shielding is provided to prevent the aforementioned disruption occurrence.

Proximity coupling of the wand and the audit structure provides for data-access communication between audit structure 40 and wand 44. To accomplish such communications, communications means, shown generally at 60 are provided.

Communication means include, in the preferred embodiment, optical structures located in both port 42 and coupling mechanism 46. Such structures take the form of a light source 62 in port 42 and a light conductor 64, also located in port 42. Conductor 64 includes sensors which detect light having a predetermined pulse pattern, generated in the circuitry included in wand 44. The pattern is converted into electrical signals by a transducer in audit structure 40, which signals comprise a data stream usable by audit structure 40. Like elements are present in wand 44, including a light source 66 and a light conductor 68 which cooperate with conductor 64 and source 62, respectively, to provide communications between audit structure 40 and wand 44. Because light sources, 62, 66 provide broad light beams, **62*a*, 66*a*, respectively, coupling mechanism 46 and port 42** need not be in absolute alignment with one another in order for communication to occur. The light sources and conductors are arranged such that light emitted from a source in one portion of the communication means will not be read by the conductor in the same part of the communication means.

Transfer of transaction or audit data between audit structure 40 and wand 44 occurs in near instantaneous fashion and requires only brief proximal alignment of wand 44 and port 42. Door 20 is unlocked nearly simultaneously by an open rack signal which is transmitted by audit structure 40 to a solenoid-operated lock/sensor **20*b*. A purchase-mechanism box solenoid-operated lock/sensor (not shown) is operable to allow access to the purchase-mechanism box and cash tray, and is controlled by a signal from audit structure 40. This arrangement provides system flexibility which enables one service person to load and remove papers from a rack while denying access to the cash tray. Access to both bay 18 and the cash tray may be provided by a single wand if the system owner so desires. Once wand 44 is withdrawn from engagement with port 42, audit structure 40 returns to the data acquisition mode of operation. Lock/sensor 20*b* is engaged and locked when door 20** is closed as is the purchase-mechanism box lock/sensor.

To further explain the workings of purchase-mechanism 32 and audit structure 40, reference is now had to FIG. 2. Mechanism 32 includes a coin slot jam detector **32*a*, a coin sensor 32*b*, and a coin return sensor 32*c*, a slug detector 32*d*, a cash tray sensor 32*e* and a jam flag indicator 32*f*. All of these sensors are operable to transmit a yes or no signal to audit structure 40. Additionally, a lock/sensor 20*b* is operable to transmit a signal representative of the open or closed condition of door 20. While a purchase-mechanism box lock/sensor is operable to transmit a signal representative of the open or closed condition of box 24. Audit structure 40 includes a processing unit which is operable to interpret and record transaction audit data as such is received by the audit structure. In the preferred embodiment, structure 40** includes an integrated circuit, which may take the form of an EPROM or, may take the for of a dedicated IC.

A similar IC forms a central processing unit 70 in wand 44. Code generating means (CGM) 72 is operable to generate first and second unit-specific codes, which are unique to the particular wand series in which CGM 72 is mounted. Audit structure 40 is operable to provide means for reading the first and second unit-specific codes, and either allowing or disallowing the machine access depending upon the identity of the unit specific code. Put another way, if an appropriate first code is generated, mechanism 32 is programmed to unlock door 20, provide access to bay 18 and transfer data to one wand series only. Means for reading the first unit specific code are provided in audit structure 40 and such means are operable to allow or disallow machine access and transfer of data. The access and transfer of data will be allowed only if a wand having the proper unit-specific code is proximity coupled to audit structure 40. If the wand does not have the proper code, access to the machine will be denied and no data will be transferred.

If the second code is transmitted, means for reading the second code in audit structure 40 determine if the code is correct, and if correct, allow access to purchase-mechanism box 24 by unlocking the other lock system (not shown) for box 24.

Figure 4:
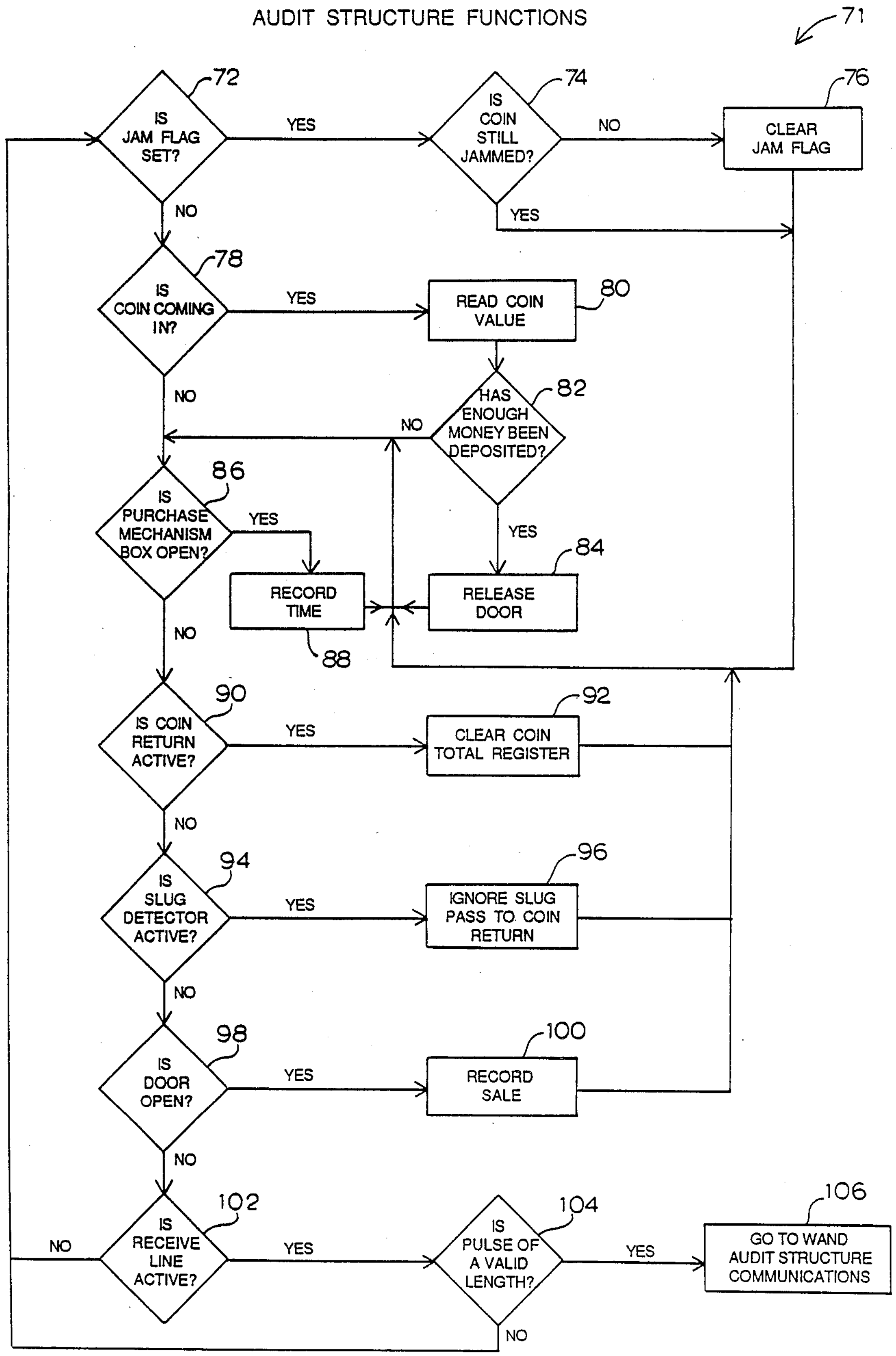
FIG. 4 is a flow chart of coin counter functions of the invention.

Turning now to FIG. 4, the internal functions of purchase-mechanism 32 are depicted in a flow chart. These functions are conducted when audit structure 40 is in what is referred to herein as a data acquisition mode and is operating at a low clock speed. This sequence operates continuously at a clock speed of 32.768 KHz. The first inquiry is depicted in block 72 and checks the jammed-coin slot sensor **32*a* to determine if a jam flag 32*f* is set. If the flag is set, inquiry 74 determines whether the coin slot is still jammed. If the answer is yes and the slot is still jammed, the processing unit will cycle through its program until such time as a no answer is received. When this happens, instruction 76 clears jam flag 32*f*** and the program continues.

When a no answer is noted in response to inquiry 72, inquiry 78 determines whether a coin is coming in. If the answer is no, the processing unit continues through its passive cycling. If the answer is yes, instruction block 80 causes coin sensor **32*b* to read the value of the coin. Inquiry 82 determines if enough money has been deposited and if the answer is no, cycles through the program until a yes answer is received, whereupon instruction 84 unlocks door-lock 20*b*. Inquiry 86 determines whether purchase-mechanism box 24 is open and if it is, instruction 88 causes the time to be recorded and stores the time in the memory portion of audit structure 40**.

If the purchase-mechanism box is not open, inquiry 90 determines whether the coin return is active and if it is, instruction 92 causes the coin total register to be cleared, in anticipation of the next sale. The cycle continues to inquiry 94 which determines whether a slug has been deposited in the machine and if so, instruction 96 activates the appropriate coin path guides to let the slug fall through into the coin return. Inquiry 98 reads door lock/sensor **20*b* to determine if the door is open and if the answer is yes, instruction 100 causes a sale time to be recorded and stored in audit structure 40. Inquiry 102 determines whether the receive line is active. The receive line will be active if light connector 64 has received the appropriate optic signal. If a signal is not present, the processing unit continues in its data acquisition mode. If a signal has been received, inquiry 104 determines whether the appropriate unit-specific code(s) has been transmitted. If the answer is no, the system continues in the data acquisition mode. If the answer is yes, audit structure 40 shifts into the data transfer mode and sets up communication between wand 44 and audit structure 40, as depicted in block 106**.

Figure 5:
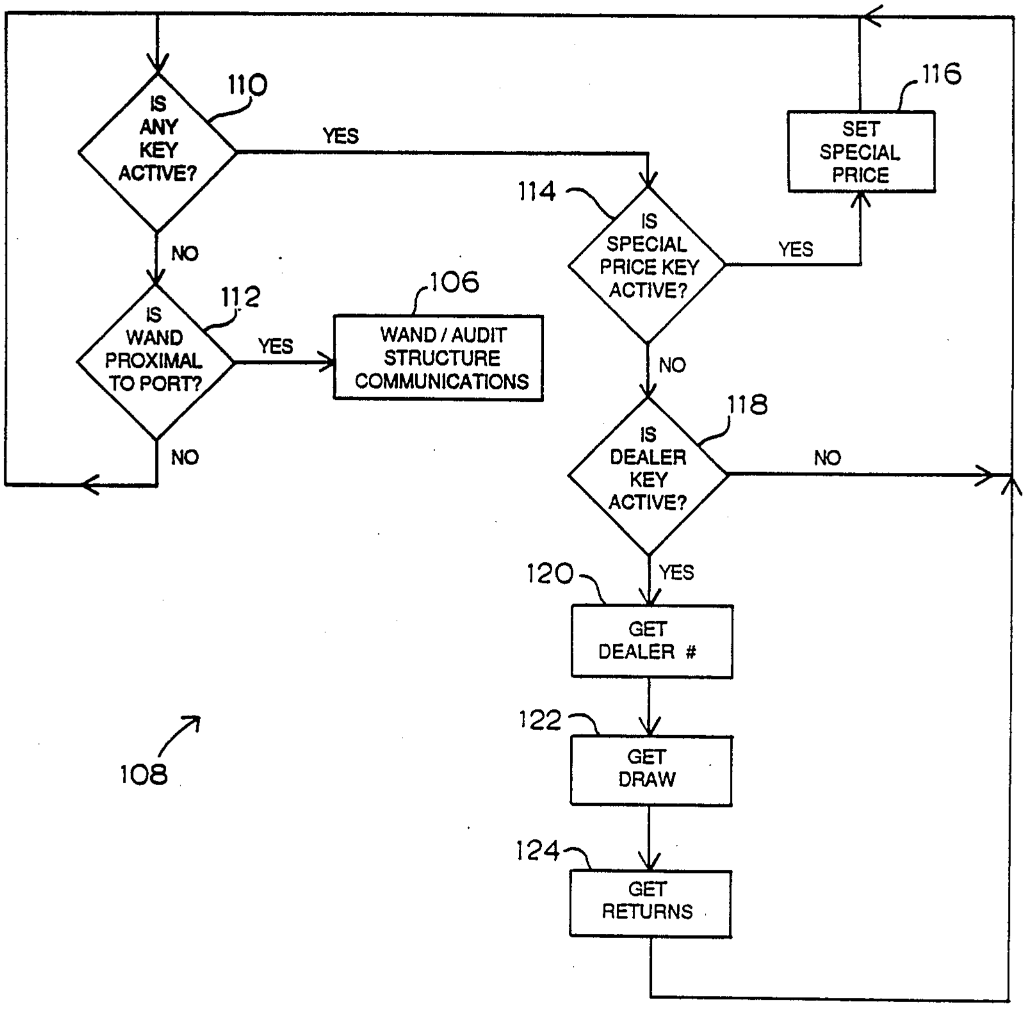
FIG. 5 is a flow chart of wand functions of the invention.
Figure 6A:
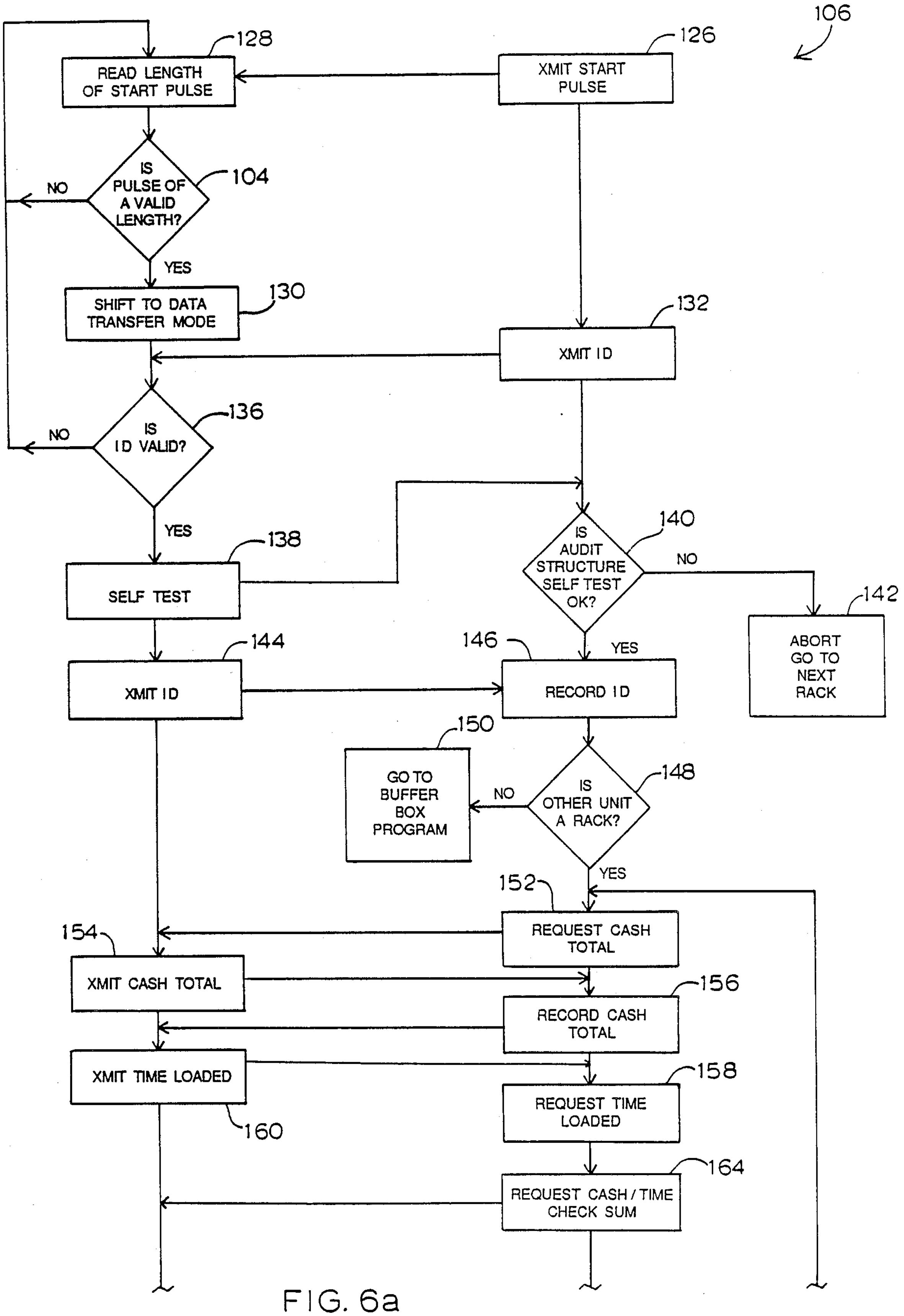
Figure 6B:
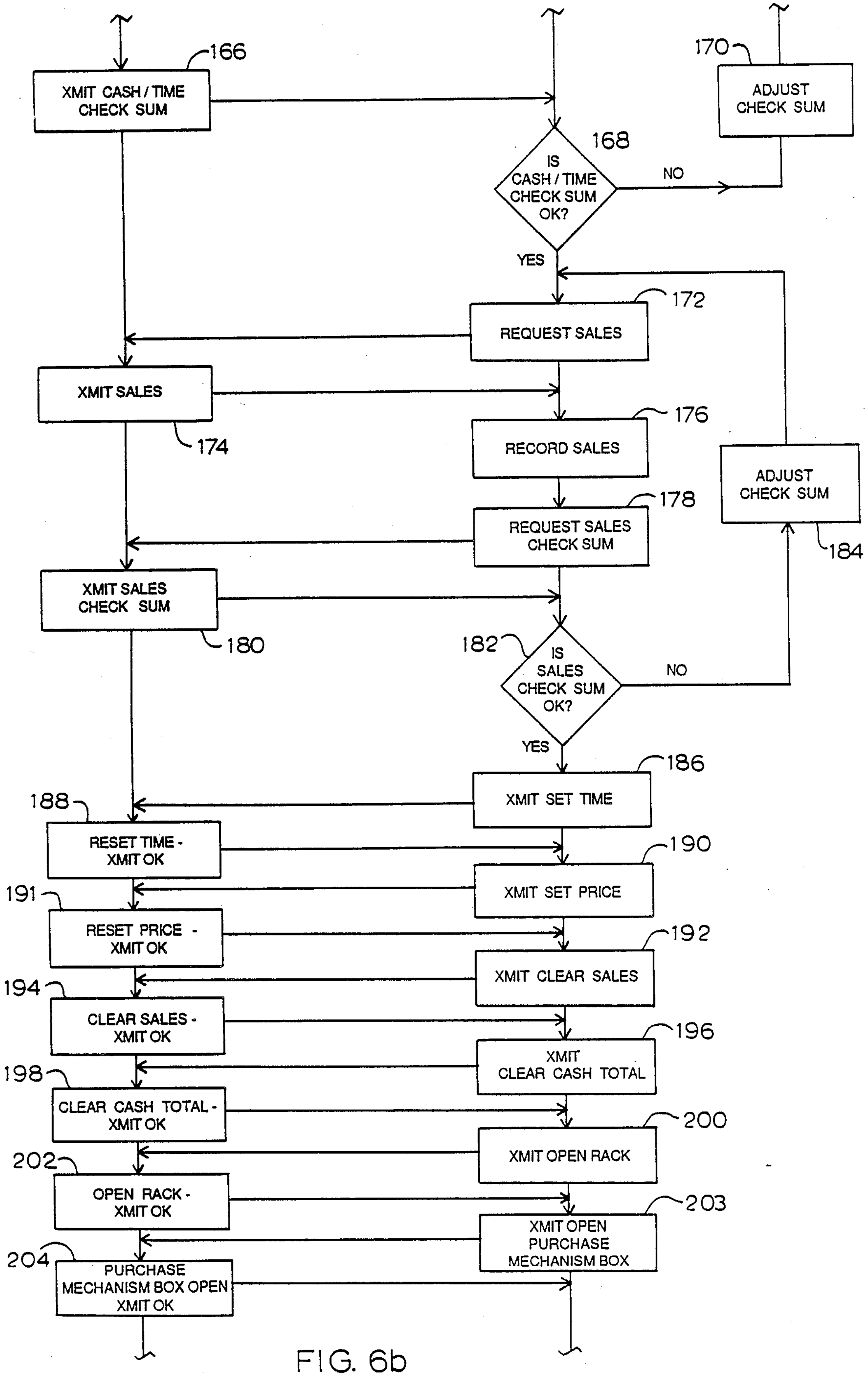
Figure 6C:
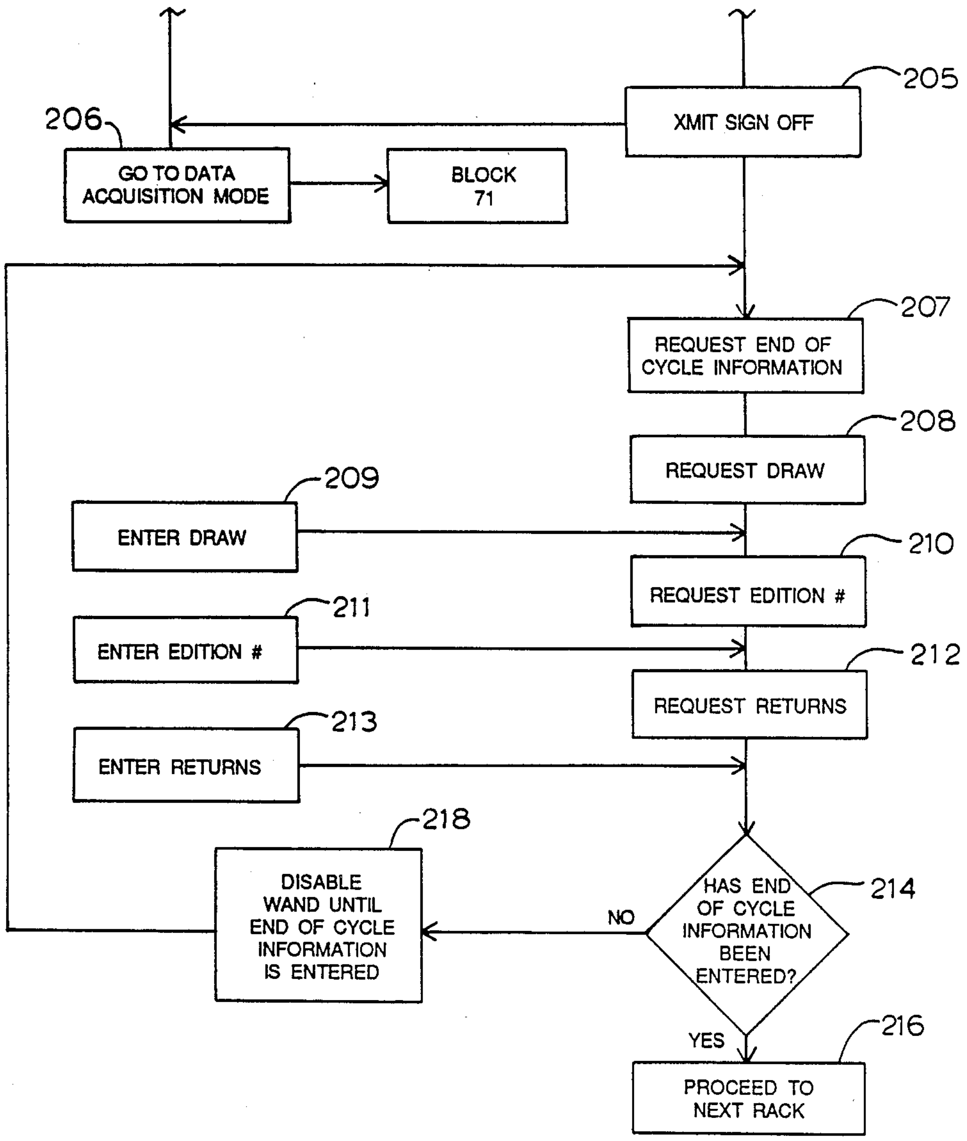

Turning now to FIG. 5, wand non-communication functions are depicted generally at 108. Initially, inquiry 110 determines if any key on key board 48 is depressed. If the answer is no, inquiry 112 asks whether wand 44 is in proximity coupling with a port on a purchase-mechanism or buffer box. If the answer is yes, wand 44 establishes communications with the appropriate audit structure, block 106. If the answer is no, the wand cycles through program 108 until inquiry 110 or 112 receives a yes answer.

If inquiry 110 receives a yes answer, inquiry 114 asks if special price key **48*a* is depressed. If the answer is yes, instruction 116 sets a special price in response to preprogrammed instruction. If the special price key is not activated, inquiry 118 asks if dealer key 48*b* is activated. If the answer is yes, display 49 provides a prompt and asks for a dealer number which is input in response to instruction 120. Instruction 123 generates a prompt which asks for a draw. Once the draw (number of papers to be inserted into rack machines or delivered to a dealer outlet) is entered, instruction 124 causes display 49** to prompt the service person for the number of returns, which is entered in the key pad. Once this information is entered, the wand returns to its normal cycle. This manually input data is referred to herein as abbreviated audit data and is generally indicative of sales by a dealer outlet. No time data for individual paper sales is reported.

Turning now to FIGS. **6*a*–6*c*, purchase-mechanism/-wand communications are depicted generally at 106**.

When wand 44 is proximity activated, the magnetic actuatable switch 58 in the wand signals CPU 70 to transmit a start pulse 126 through light source 66. The reception of the signal by light conductor 64 generates instruction 128 which causes audit structure 40 to monitor the length of the starting pulse. As previously noted, if the processing unit determines that the pulse length is valid, instruction 130 is generated and shifts the audit structure into the high clock speed, data acquisition mode. The audit structure then operates at 2 $MH_z$. If the pulse length is not valid, the audit structure continues in its low speed, data acquisition mode.

Once the audit structure has entered its data transfer mode, it waits for a group ID signal 132 from wand 44. Inquiry 136 determines whether the signal, also referred to herein as a unit specific code, is valid. If the code is valid, audit structure 40 conducts a self test 138, which results in the transmission of a signal through the communications means to the wand where inquiry 140 determines whether the audit structure self test was okay. If the self test is not performed satisfactorily, an abort message appears on display 49 and the dealer is instructed to call for maintenance personnel. Alternately, the information is stored in the wand memory and is ultimately relayed through the buffer and storage/processing unit 54 to a central maintenance facility.

If the rack self test is okay, the rack transmits its specific identification code 144 which is recorded by the wand 146.

The next inquiry from the wand, 148 asks whether the other unit is a rack. This distinction is coded into ID numbers, certain ID numbers being assigned to racks and other ID numbers being assigned to buffer boxes. If the answer indicates that the other unit is not a rack, the wand shifts into a buffer box program 150. If the other unit is a rack, the wand transmits a signal 152 through the communication means to the audit structure asking for the cash total. A signal 154 from the audit structure memory transmits the cash total to the wand, wherein the wand records the cash total 156. A signal 158 is then transmitted from the wand to the audit structure asking for the last time that the rack was loaded. A signal 160 containing this data is transmitted from the rack to the wand and recorded 162.

Values for the cash and the load time are combined into a cash/time checksum in CPU 70. Wand 44 transmits a get checksum signal 164 to audit structure 40 which transmits a signal 166 containing the checksum data to the wand. Inquiry 168 determines whether the checksum transmitted by the wand is valid in terms of the cash and time values already recorded. If the checksum is not appropriate, an adjust checksum cycle 170 causes the audit structure and wand to redo the calculations until the checksum is appropriate. Once the checksum is correct, a request sales signal 172 is transmitted to audit structure 40 which transmits a signal 174 containing its sales figures to the wand. The sales figures are recorded 176 in the wand memory. A request sales checksum signal 178 is transmitted to the audit structure and an appropriate sales checksum signal 180 is transmitted. Again, an inquiry 182 determines whether the sales checksum is correct and if not, an adjust checksum cycle 184 is entered. Once the checksum is correct, a set time signal 186 is transmitted to the audit structure which either resets the time and transmits an okay signal, or simply transmits an okay signal 188 to the wand.

Next, the wand transmits a set price signal 190 which is set in the audit structure which in turn transmits a price okay signal 191. The next series of signals between the wand and audit structure include a clear sales signal 192 and sales cleared signal 194, a clear cash total signal 196 and an okay signal 198 from the audit structure, an open rack signal 200 and a rack open signal 202. If the appropriate second unit-specific code is generated by CGM 72 and verified by audit structure 40, an open purchase-mechanism box signal 203 (which allows access to the coin mechanism and cash tray) and a purchase-mechanism box open signal 204, are exchanged. Finally, a sign-off signal 205 is transmitted from the wand, which results in instruction 206 which causes the audit structure to return to its data acquisition mode and the program depicted in block 71.

At this point, the service person is able to gain access through open door 20 to bay 18 to remove unsold newspapers and insert new papers into bay 18. If the appropriate second code has been transmitted, the coin tray may also be emptied. Once the wand is withdrawn from proximity coupling with purchase-mechanism 32, a request 207 appears on display 49 asking for what is referred to herein as end of cycle information. This takes the form of a series of requests which ask for the draw 208 (the number of papers installed in bay 18), the edition number 210 and the number of papers which were unsold 212. The requests are responded to by keyboard entries wherein the vendor enters the draw 209, the edition number 211, and the number of returns 213. Once the requests have cycled, an inquiry 214 is made as to whether the end of cycle information has been entered. If the information has been entered, the service person is ready to proceed to the next machine 216. If the end of cycle information has not been entered, instruction 218 disables the wand, which cycles back to continue requesting end of cycle information. The service person may not use the wand on the next machine until the end of cycle information has been entered relevant to the previous machine.

Once the service person has completed his distribution rounds, he returns to a central location and brings the wand into proximity coupling with a buffer. The initial sequence of events with the buffer is identical to that with the audit structure, as depicted in FIG. 5, until inquiry 148 is made as to whether the other unit is a rack. At this point, the answer is no and the wand enters a buffer box program 150, depicted in FIG. 7.

Once the wand is notified that the other unit is a buffer box, it conducts a self test 220 and transmits the results to the buffer. Inquiry 222 asks whether or not the self test is acceptable, and, if the answer is no, instruction 224 causes the communications to be aborted. If the self test is okay, the wand transmits an ID number 226 which is recorded 228 by the buffer. The wand then transmits a run number signal 230 which is recorded 232 by the buffer.

The wand next cycles to compile rack sales and returns which include the information depicted in block 236, and transmits the data as a signal 234. This information includes, for each machine, the total cash, the time the machine was loaded or serviced, the number of sales and the times of the individual sales, the number of newspapers inserted into the machine and the number of returns picked up from the machine. A signal containing this information 238 is transmitted to the buffer and recorded 240. An inquiry 242 asks if there is any more audit data recorded in the wand. If the answer is yes, the cycle continues until the wand is totally down loaded. Once the wand is totally down loaded, CPU 70 compiles a sales checksum 244 which is transmitted as a sales checksum signal 246 to the buffer. The buffer records the signal 248 and inquires 250 as to whether or not the checksum is correct. If the checksum is not correct, the entire down load procedure to rerun until the checksum is appropriate. If the checksum is acceptable, a sales checksum okay signal 252 is transmitted to the wand.

A series of instructions are transmitted to the wand and are recorded therein, as follows: the buffer sends a clear memory signal 254, a time signal 256, an edition day signal 258, an edition number signal 260 and a price signal 262. The wand initially responds by clearing memory 255, setting its time register 257, setting the edition day register 259, setting the edition number register 261 and setting the price register 263.

The buffer next transmits a sign-off signal 264, which includes time-lock interval data, at which point the time lock on the wand is reset 265. The time lock is operable to automatically disable the wand at the end of a predetermined active time interval unless the wand once again communicates with a buffer box during the interval. This feature minimizes system compromise in the event that a wand is lost or finds its way into unauthorized hands. In the preferred embodiment, the time lock interval is set for 24 hours, although longer or shorter intervals may be set by the buffer box instructions.

The wand is now in a operable condition to be used for the next delivery cycle to the individual rack machines and associated dealer outlets. The down loaded information in the buffer box is transmitted to the central processing unit 54 where the data is tabulated and analyzed. Additionally future changes for price edition, number, etc., are transmitted from the CPU to the buffer boxes to be loaded into the memory of the wands on the next cycle. Unit 54 is also operable to adjust programming and instructions which are stored in the multiple buffer boxes and ultimately transmitted to the wands.

Thus, a system has been disclosed which enables sellers of newspapers to track automatically the sales of newspaper through newspaper rack machines, and which accommodates the integration of data from dealer outlets. This is of particular importance because of changes in newspaper buying habits of the public in recent years, which trend is for more individuals to buy newspapers from rack machines and dealer outlets, with subscription sales experiencing a relative decline. It is of significant economic importance that rack machines have sufficient newspapers therein so that any individual wishing to purchase a paper can do so. However, merely fully loading all of rack machines with newspapers to the capacity of the machines has an adverse economic impact, in that, in many locations, machines will not sell out, and excess newspapers therein will represent a "loss" expense.

By tracking the time of sales of newspapers, it is possible to determine when a rack sells out of papers and to determine empirically therefrom how many additional papers need to be placed in that particular machine. The result may be that a particular machine needs to be loaded several times during the course of a day, or that a machine need contain only a small number of papers or that sales from a particular machine are so small as to warrant relocation of the machine.

Additional correlation between newspaper content and geographical distributing of sales may be determined and the number of papers placed in the machines adjusted accordingly. For instance, if it is determined that particular racks tend to sell out rapidly when a particular type of sports story is included in a paper, the rack can be scheduled to receive additional papers when such a story appears.

Although a preferred embodiment of the invention has been described herein it should be appreciated that variations and modifications may be made thereto without departing from the spirit of the invention.

It is claimed and desired to secure Letters Patent:

1. A retrofit, automatic audit system for incorporation in the purchase-mechanism box of a standardized-type, door-access coin operated newspaper rack machine, which box includes a key-receiving aperture, said system comprising

- a frame,
- retrofit purchase-mechanism mounted on said frame,
- electromechanical audit structure carried on said frame and operatively coupled to said purchase-mechanism for monitoring and recording transaction data involving the purchase-mechanism, said audit structure including a weather-closed, remote-proximity-activated, data-access communication port seal-fittable within such an aperture with the system retrofitted in such a box, and
- a free, portable, data-transfer unit proximity coupleable, from the outside of such machine via said port, with said audit structure for acquiring audit data recorded therein, proximity coupling of said unit and said port initiating, automatically, a data transfer mode of operation in the system.

2. The system of claim 1, wherein proximity activation is accomplished through magnetic structure.

3. The system of claim 2, wherein said magnetic structure includes a magnet in said port and a magnetically actuatable switch in said unit.

4. The system of claim 3, wherein said port includes a male projection which extends outwardly from such an aperture with the system retrofitted in such a box, said magnet extends, in this setting, within said projection outwardly from the aperture, and said unit includes an exposed female portion which is dockable with said male projection.

5. The system of claims 1, 2, 3 or 4, wherein communication between said audit structure and said data transfer unit takes place via optical structure.

6. The system of claim 5, wherein said optical structure includes a light source and a light conductor in each of said ports and said unit, with the source in the unit being adapted for communication with the conductor in the port, and vice versa.

7. The system of claim 1, wherein said audit structure, in operative retrofitted condition, is operatively connected to the usual door-lock mechanism in such a rack machine, and proximity coupling of said unit and said port effects, automatically, unlocking of such a door-lock mechanism.

8. The system of claim 1, wherein said data transfer unit includes manual manipulation means, and system-disabling structure which requires, at the conclusion of an acquisition of data by said unit, that the unit receive, via operation of said manual manipulation means, a transfer-conclusion, preselected data stream.

9. The system of claim 8, wherein said data transfer unit includes means for acquiring abbreviated audit data.

10. The system of claim 9, wherein said means for acquiring includes said manual manipulation means.

11. The system of claim 1, wherein said data-transfer unit includes first code generating means therein for generating a first unit-specific code and wherein said audit structure includes means for reading said first unit-specific code and for allowing, or disallowing, depending on the correctness of said first code, machine access and transfer of data to said data-transfer unit.

12. The system of claim 1, wherein said data-transfer unit includes second code generating means therein for generating a second unit-specific code and wherein said audit structure includes means for reading said second unit-specific code and for allowing, or disallowing, depending on the correctness of said second code, access to said purchase-mechanism box.

13. The system of claim 1, which further includes buffer means for receiving audit data stored in said data-transfer unit and for transmitting to said data-transfer unit time-lock interval data for setting a predetermined active time interval in said data-transfer unit, said data-transfer unit automatically becoming inoperative at the end of said active time interval.

14. A retrofit, automatic audit system for incorporation in the purchase-mechanism box of a standardized-type, door-access newspaper rack machine, which box includes a key-receiving aperture, said system comprising:

a frame, retrofit purchase-mechanism mounted on said frame, electromechanical audit structure carried on said frame and operatively coupled to said purchase-mechanism for monitoring and recording transaction data involving the purchase-mechanism, including a weather-closed remote-proximity activated, data-access communication port fittable within such an aperture with the system retrofitted in such a box, and a free, portable, data-transfer device proximity coupleable, from the outside of such a machine via said port, with said audit structure for acquiring audit data recorded therein.

15. The system of claim 14, wherein proximity activation is accomplished through magnetic means including a magnet in said port and a magnetically actuatable switch in said unit.

16. The system of claims 14 or 15 which further includes communication means for communication between said audit structure and said data transfer unit, said means including a light scurce and a light conductor in each of said ports and said unit, with the source in the unit being constructed and arranged for communications with the conductor in the port, and vice versa.

17. The system of claim 14, wherein said audit structure in operative retrofitted condition, is operatively connected to the usual door-lock mechanism in such a rack machine, and wherein proximity coupling of said unit and said port effects, automatically, unlocking of such a door-lock mechanism thereby permitting opening of the door, and wherein disengagement of said unit from said port sets the door-lock mechanism for locking engagement with the door when the door is opened and then closed.

18. The system of claim 14, wherein said data transfer unit includes manual manipulation means, and system-disabling structure which requires, at the conclusion of an acquisition of data by said unit, that the unit receive, via operation of said manual manipulation means, a transfer conclusion, preselected data stream.

19. The system of claim 18, wherein said data-transfer unit includes means for acquiring abbreviated audit data.

20. The system of claim 18, wherein said means for acquiring includes said manual manipulation means.

21. The system of claim 14, wherein said data-transfer unit includes first code generating means therein for generating a first unit-specific code and wherein said audit structure includes means for reading said first unit-specific code and for allowing, or disallowing, depending on the correctness of said first code, machine access and transfer of data to said data-transfer unit.

22. The system of claim 14, wherein said data-transfer unit includes second code generating means therein for generating a second unit-specific code and wherein said audit structure includes means for reading said second unit-specific code and for allowing or disallowing, depending on the correctness of said second code, access to said purchase-mechanism box.

23. The system of claim 14, which further includes buffer means for receiving audit data stored in said data-transfer unit and for transmitting to said data-transfer unit time-lock interval data for setting a predetermined active time interval in said data-transfer unit, said data-transfer unit automatically becoming inoperative at the end of said active time interval.

24. A retrofit, automatic audit system for incorporation in the purchase-mechanism box of a standardized-type, door-access coin operated newspaper rack machine, which box includes a key-receiving aperture, said system comprising:

a frame, retrofit purchase-mechanism mounted on said frame, electromechanical audit structure carried on said frame and operatively coupled to said purchase-mechanism for monitoring and recording transaction data involving the purchase-mechanism, said audit structure including a weather-closed, remote-proximity-activated, data access communications port seal-fittable within such an aperture with the system retrofitted in such a box, and a free, portable, data-transfer unit proximity coupleable, from the outside of such machine via said port, with said audit structure for acquiring audit data recorded therein, proximity coupling of said unit and said port initiating, automatically, a data transferal mode of operation in the system and removal of said unit from the proximity of said port initiating, automatically, a data acquisition mode of operation in said audit structure.

25. The system of claim 24, wherein communication between said audit structure and said data transfer unit takes place via optical structure.

26. The system of claim 25, wherein said optical structure includes a light source and a light conductor in each of said ports and said unit, with the source in the unit being adapted for communication with the conductor in the port, and vice versa.

27. The system of claim 24, wherein said audit structure in operative retrofitted condition, is operatively connected to the usual door-lock mechanism in such a rack machine, and wherein proximity coupling of said unit and said port effects, automatically, unlocking of such a door-lock mechanism thereby permitting opening of the door, and wherein disengagement of said unit from said port sets the door-lock mechanism for locking engagement with the door when the door is opened and then closed.

28. The system of claim 24, wherein proximity activation is accomplished through magnetic means including a magnet in said port and a magnetically actuated switch in said unit and which further includes communications means for communication between said audit structure and said data transfer unit, said communication means including a light source and a light conductor in each of said ports and said unit, with the source in the unit being constructed and arranged for communications with the conductor in the port, and vice versa.

29. The system of claim 24, wherein said data-transfer unit includes first code generating means therein for generating a first unit-specific code and wherein said audit structure includes means for reading said first unit-specific code and for allowing, or disallowing, depending on the correctness of said first code, machine access and transfer of data to said data-transfer unit.

30. The system of claim 24, wherein said data-transfer unit includes second code generating means therein for generating a second unit-specific code and wherein said audit structure includes means for reading said second unit-specific code and for allowing or disallowing, depending on the correctness of said second code, access to said purchase-mechanism box.

31. The system of claim 24, which further includes buffer means for receiving audit data stored in said data-transfer unit and for transmitting to said data-transfer unit time-lock interval data for setting a predetermined active time interval in said data-transfer unit, said data-transfer unit automatically becoming inoperative at the end of said active time interval.

* * * * *